C. B. STEBBINS.
PISTON.
APPLICATION FILED JUNE 25, 1915.
1,157,130.
Patented Oct. 19, 1915.
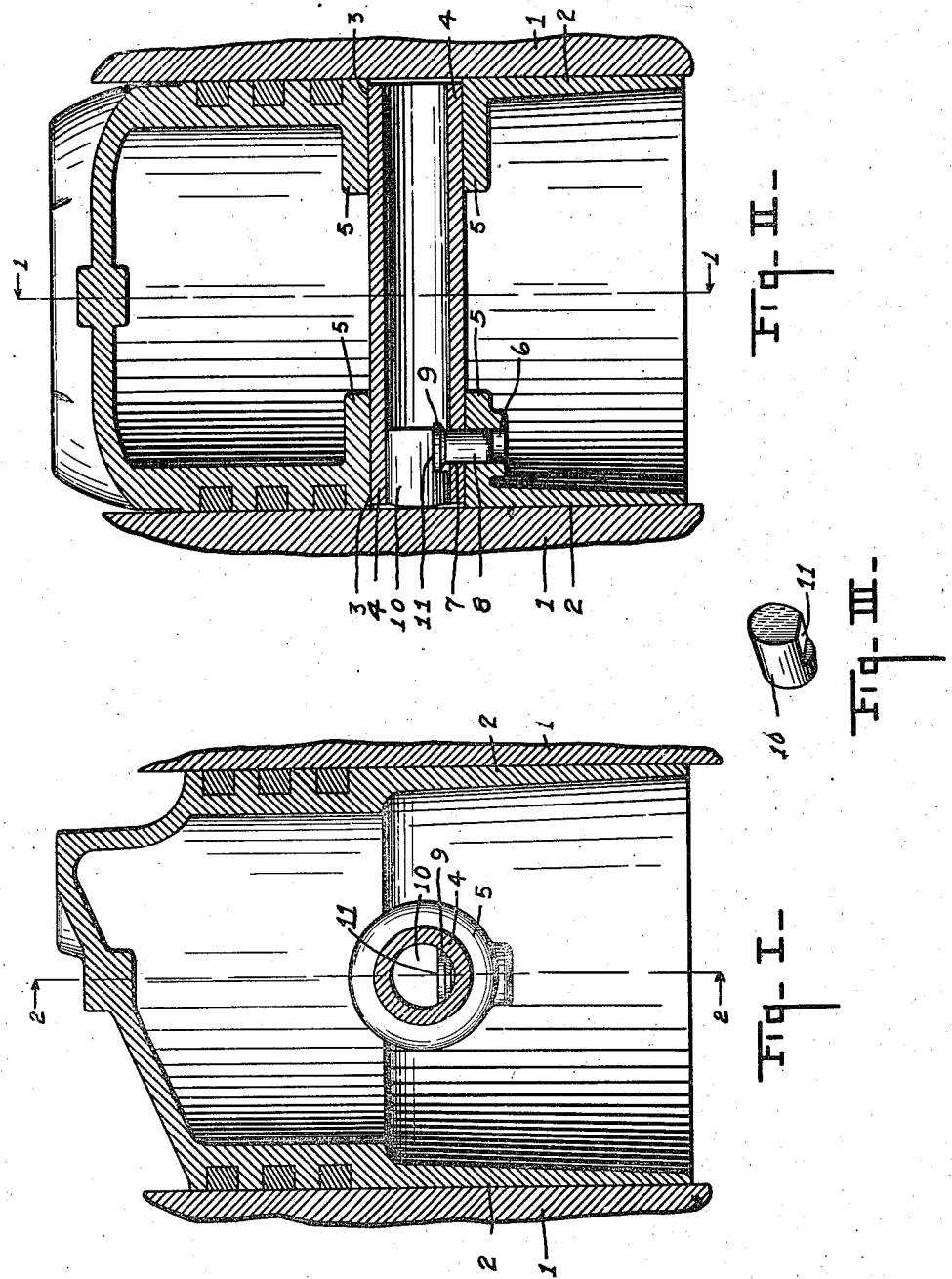
WITNESSES:
INVENTOR
CHARLES B. STEBBINS
BY
ATTORNEYS

UNITED STATES PATENT OFFICE.

CHARLES B. STEBBINS, OF THREE RIVERS, MICHIGAN, ASSIGNOR TO SHEFFIELD CAR COMPANY, OF THREE RIVERS, MICHIGAN.

PISTON.

1,157,130.          Specification of Letters Patent.          Patented Oct. 19, 1915.

Application filed June 25, 1915. Serial No. 36,305.

*To all whom it may concern:*

Be it known that I, CHARLES B. STEBBINS, a citizen of the United States, residing at Three Rivers, in the county of St. Joseph and State of Michigan, have invented certain new and useful Improvements in Pistons, of which the following is a specification.

This invention relates to improvements in pistons.

The main objects of this invention are: First, to provide in a piston an improved locking or retaining means for the piston pin. Second, to provide in a piston an improved locking or retaining means for the piston pin which effectively retains the pin and at the same time permits its convenient removal and replacement as occasion requires.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a detail vertical section through a cylinder and piston embodying the features of my invention transversely of the piston pin on a line corresponding to line 1—1 of Fig. II, the piston rod being omitted. Fig. II is a longitudinal central section on a line corresponding to line 2—2 of Fig. I. Fig. III is a perspective view of the locking pin retaining plug.

In the drawing, similar reference characters refer to similar parts throughout the several views, and the sectional views are taken looking in the direction of the little arrows at the ends of the section lines.

Referring to the drawings, 1 represents the cylinder of an engine and 2 the piston, the piston illustrated being designed for two cycle explosion engines. The piston is provided with bores 3 for the piston pin 4 and preferably has inwardly projecting piston pin supporting flanges 5. One of these flanges 5 is provided with a locking pin hole 6. The tubular piston pin 4 is provided with a locking pin hole 7 registering with the locking pin hole 6 in the flange. The locking pin 8 is disposed in these holes with its head 9 within the piston pin. The locking pin 8 is retained by the locking plug 10 which is shouldered at 11 to engage the head of the pin, the pin being overlapped by the locking plug in the shoulder, limiting the inward movement of the locking plug. The locking plug is retained in the piston pin by the walls of the cylinder when the piston is assembled therein. By this simple means I effectively retain the piston pin and at the same time it can be quickly removed for any purpose and replaced.

In assembling it is only necessary to slip the piston pin into the cylinder bores 3, bringing the holes 6 and 7 into register, and drop the locking pin 8 into place from the inside of the piston pin. The retaining plug 9 is then inserted and when the piston is in the cylinder the parts cannot become disarranged. In disassembling the piston is removed from the cylinder when the plug 9 can be pushed out from the opposite end of the piston pin and the locking pin pushed out from the inside of the piston.

The parts are very simple and economical to produce, and, as stated, quickly and easily assembled and when assembled are perfectly secure.

I have shown my improvements in the form in which I have embodied them in use. I have not attempted to illustrate or describe certain modifications which might be desirable for different adaptations of my improvements as I believe the disclosure made will enable those skilled in the art to which my invention relates to embody or adapt my improvements as circumstances may require.

Having thus described my invention, what I claim as new and desire to secure by Letters Patent, is:

1. The combination with a cylinder, of a hollow piston having piston pin bores through the walls thereof and inwardly projecting flanges about the bores, one of said flanges having a locking pin hole therethrough, a tubular piston pin having a transverse locking pin hole therein registering with said locking pin hole in said flange, a headed locking pin disposed in said holes in said piston pin and flange with its head on the inside of the piston pin, and a locking pin retaining plug disposed in said piston pin and shouldered to engage and overlap said locking pin, said plug being retained by the wall of said cylinder, its inward movement being limited by said locking pin.

2. The combination of a hollow piston having piston bores through the walls thereof and inwardly projecting flanges about the bores, one of said flanges having a locking pin hole therethrough, a tubular piston pin having a transverse locking pin hole in said flange, a headed locking pin disposed in said holes in said piston pin and flange with its head on the inside of the piston pin, and a locking pin retaining plug disposed in said piston pin to engage and retain said locking pin.

3. The combination with a cylinder, of a hollow piston having a piston pin bore in the wall thereof and an inwardly projecting flange about the bore, said flange having a locking pin hole therethrough, a tubular piston pin having a transverse locking pin hole therein registering with said locking pin hole in said flange, a locking pin disposed in said holes in said piston pin and flange and removable from the inside of the piston pin, and a locking pin retaining plug disposed in said piston pin to engage and retain said locking pin, said plug being retained by the wall of said cylinder.

4. The combination of a hollow piston having a piston pin bore in the wall thereof and an inwardly projecting flange about the bore, said flange having a locking pin hole therethrough, a tubular piston pin having a transverse locking pin hole therein registering with said locking pin hole in said flange, a locking pin disposed in said holes in said piston pin and flange and removable from the inside of the piston pin, and a locking pin retaining plug disposed in said piston pin to engage and retain said locking pin.

5. The combination with a cylinder, of a piston having a piston pin bore therein, a tubular piston pin having a transverse locking pin hole therein, there being a locking pin hole in said piston registering therewith, a headed locking pin disposed in said holes in said piston pin and piston with its head on the inside of the piston pin, and a locking pin retaining plug disposed in the end of said piston pin and shouldered to engage and overlap said locking pin, said plug being retained by the wall of said cylinder, its inward movement being limited by said locking pin.

6. The combination of a piston having a piston bore therein, a tubular piston pin having a transverse locking pin hole therein, there being a locking pin hole in said piston registering therewith, a locking pin disposed in said holes in said piston pin and piston and removable from the inside of the piston pin, and a locking pin retaining plug disposed in said piston pin to engage and retain said locking pin.

In witness whereof, I have hereunto set my hand and seal in the presence of two witnesses.

CHARLES B. STEBBINS. [L. S.]

Witnesses:
  ORLEY R. BAIRD,
  ADA BERGER.